United States Patent [19]

Heatherington

[11] Patent Number: 4,504,802
[45] Date of Patent: Mar. 12, 1985

[54] DIGITAL PSK MODULATOR FOR MODEM

[75] Inventor: Dale A. Heatherington, Alpharetta, Ga.

[73] Assignee: Hayes Microcomputer Products, Inc., Atlanta, Ga.

[21] Appl. No.: 517,819

[22] Filed: Jul. 27, 1983

[51] Int. Cl.³ .............................................. H04L 27/20
[52] U.S. Cl. ..................................... 332/18; 332/9 R; 332/16 R; 332/22; 375/52; 375/67
[58] Field of Search ................. 332/9 R, 16 R, 18, 22; 375/52, 53, 54, 55, 56, 57, 67

[56] References Cited

U.S. PATENT DOCUMENTS

| | | | |
|---|---|---|---|
| 3,128,343 | 4/1964 | Baker | 178/67 |
| 4,049,909 | 9/1977 | Peck | 178/67 |
| 4,327,439 | 4/1982 | Göckler et al. | 375/67 |

OTHER PUBLICATIONS

"A MOS/LSI Multiple-Configuration 9600 BPS Data Modem", by Logan and Forney; Proceedings of the 1976 IEEE International Conference on Communications.
"A New Multilevel Modulation and Demodulation System for Carrier Digital Transmission" by Ishio et al.; 1976 IEEE International Conference on Communications.
"The Design of Modems for Digital Data Communication" by Kretzmer; 1976 IEEE International Conference on Digital Communications.
"Microprocessor Controlled 4800 B/S Modem: Lower Cost Versatility", by Walsh and Shum; Proceedings of the 1979 IEEE International Conference on Communications.
"Multiprocessor Architecture for Voiceband Data Processing (Application to 9600 BPS Modem)" by Murano et al.; Proceedings of 1979 IEEE International Conference on Communications.
"A 4800 Bit/s Microprocessor Data Modem" by Watanabe et al.; vol. COM-26, No. 5, IEEE Transactions on Communications, May 1978.
"Implementation of High Speed Data Sets with Microprogrammable Data Processors" by Caplin et al.; Proceedings of the IEEE 11th Annual Microprogramming Workshop, Nov. 1978.
"Digital Implementation of an FFSK Modem" by Matyas et al.; Conference Record of the IEEE 1978 National Telecommunications Conference.
"A PSK Modem Employing Microprocessor-Based Digital Signal-Processing Techniques" by Kirkpatrick et al.; Proceedings of the 1977 IEEE International Conference on Communications.
"Microprocessor Implementation of High-Speed Data Modems" by Van Gerwen et al.; vol. COM-25, No. 2, IEEE Transactions on Communications, Feb. 1977.
"Microprocessor Implementation of Data Modems" by Snijders; Proceedings of IEEE Eurocon 1977 Conference on Communications.

Primary Examiner—Siegfried H. Grimm
Attorney, Agent, or Firm—Jones & Askew

[57] ABSTRACT

An improved four-phase differential phase shift keyed modulator for use in a modem is shown. A microprocessor (15) generates two vectors of equal frequency and equal magnitude, but different relative phases, by reference to a cyclic sine table contained in a read only memory (22). Values of the two vectors are summed and provided as an output (32) to a digital to analog converter (35). The phase shift of the carrier in a phase plane with reference to a predetermined reference phase (86) shows that the path taken by a vector in the phase plane defines a straight line (88) between two phase values by which dibits are encoded. The result is lower out-of-band transmitted signals resulting in a relatively simple transmit filter (37).

4 Claims, 6 Drawing Figures

DIGITAL PSK MODULATOR FOR MODEM

TECHNICAL FIELD

The present invention relates to transmission of information by phase shift keyed modulation, and particularly discloses an improved device for phase shift keyed (PSK) modulated data transmission wherein the signal transmitted by each keying of the transmitter is determined by a vector in a phase plane having one of a set of possible phases, wherein all allowable vectors have the same length.

BACKGROUND OF THE INVENTION

Since widespread use of integrated circuits began in the 1960s, the demand for data communications equipment has increased rapidly throughout the world. As more and more businesses, and even homes, come to rely on low-cost computers, there is a growing need for data communications devices, commonly known as modems, which may be used over dial-up voice grade telephone lines.

Due to the limited bandwidth of voice grade telephone lines, various schemes for modulating data in a form which can be transmitted over voice grade telephone lines have developed. In particular, several methods of encoding information by the relative phase of a signal transmitted over the telephone line have been developed to increase the rate at which data may be transmitted over a band limited channel of a specified bandwidth. One of the most popular forms of phase encoding has been differential four-phase, phase shift keyed (PSK) encoding. In this arrangement, a carrier of a constant frequency is transmitted and information is encoded by differences in the relative phase of the carrier which occur at predetermined "bit times". The phase distortion of the transmission channel is ultimately an upper limit. However, since the baud, or keying, rate for the transmission is directly proportional to the bandwidth of the channel, the approach has been to encode multiple bits of binary data for each keying of the transmitter. Thus, the more bits which can be encoded in each change of the output signal from the transmitter, the more information can be transmitted per unit time over a transmission channel of a specified bandwidth. Experience has taught that information can be transmitted reliably via this form of encoding over voice grade telephone lines and that transmitters and receivers for this type of signal may be economically made.

In differential four-phase PSK, a carrier signal of a specified frequency (usually either 1200 or 2400 Hz) is transmitted. Each keying of the transmitter (each "bit time") will cause the transmitted signal to be characterized by one of four possible phases relative to its previous phase. Since there are four possible changes for each keying of the transmitter, two bits may be encoded in each keying of the transmitter, and thus the scheme will transmit two bits per baud. A further specification of this popular form of data transmission is that the transmitter is operated at a 600 baud rate and thus 1200 bits per second may be transmitted.

As cheaper digital electronic circuits became available, a number of arrangements for modulating differential four-phase PSK have been incorporated. For example, one well known scheme used in Bell 212A modems has involved stuffing of bits into a bit stream in a shift register to effect the phase shifts. This arrangement is shown in U.S. Pat. No. 4,049,909 to Peck.

While it has long been recognized that digital arrangements for generating the PSK signal can be implemented more cheaply than most analog arrangements, many digital modulators have high levels of out-of-band signals and require more complex, and thus more expensive, band pass filters to be inserted between the output of the modulator and the telephone line carrying the signal.

It is known to those skilled in the art that it is highly desirable to use microprocessors in implementing modems. Microprocessors have been used in the past, to implement a number of different functions within a modem including demodulation of data. See for example U.S. Pat. No. 4,431,867 to Dale A. Heatherington which is assigned to the assignee of the present invention.

Thus, while digital modulators for differential PSK data transmission have been used, a significant amount of the cost savings has been offset by the requirement of increased filtering of the output signal. There is thus a need in the art to provide a digital differential PSK modulator, particularly one which may be implemented with apparatus which includes a microprocessor or one chip microcomputer, which produces lower levels of out-of-band signals, and thus requires less expensive transmit filters to be used.

The design of receivers is based on the premise that it is the relative phase between a present bit time and the previous bit time that is important to the receiver, and not the particular path by which a vector in a phase plane representing the relative phase of the carrier signal took to arrive at its new phase value. However, as more and more receivers for differential PSK employ phase lock loops as part of the receiving apparatus, the $d\phi/dt$ characteristic of the transmission signal becomes more important. For example, for transmission at commonly used 600 baud/1200 bit per second four-phase PSK, a succession of 90° phase shifts will cause the phase lock loop in the receiver to detect a shift in the carrier frequency in excess of 100 Hz making tracking difficult.

Thus, there is a need in the art to further provide digital modulators which not only reduce the out-of-band transmission which must be filtered by relatively expensive analog transmit filters, but also present a signal which is relatively easy for a phase lock loop in a receiver to lock onto.

SUMMARY OF THE PRESENT INVENTION

The present invention provides such an improved digital modulator.

Broadly stated, the present invention provides a differential PSK modulator for which part of the apparatus implementing the modulator is a microprocessor. The present invention provides a phase modulated carrier signal which is derived as the result of the digital generation of two carriers of equal frequency and equal magnitude which have different relative phases during phase shifts of the carrier, and the same phase when no shift is occurring.

Also, the present invention may be broadly characterized as a digital PSK modulator wherein the resultant vector in a phase plane defining the relative phases of the carrier at different bit times (and thus the vector which defines the nature of the signal transmitted to the telephone line) is one which traces a straight line between all allowable points in the phase plane rather than the more familiar arcuate path between allowable points in the phase plane which results from the phase shifting of a vector of constant length.

It is known to those skilled in the art that band pass filtered quadrature PSK output signals will approximate straight line transitions in the phase plane, as described above. A key element of the present invention is that it provides apparatus which directly synthesizes a modulated carrier signal which, when represented in the phase plane, will provide this straight line transition. Thus, the present invention provides direct synthesis of an output which, when represented in the phase plane, approximates prior art signals which use conventional modulators and high order band pass filters. See for example the phase plane representations on page 201 of *Digital Communications: Satellite/Earth Station Engineering* by Kamilo Feher, Prestice-Hall, 1983.

In its preferred form, the present invention digitally implements a pair of output signals having the same frequency and the same magnitude. The relative phase between these carrier signals is changed in order to effect the above-recited result of shifting a resultant vector along a straight line path between allowable points in the phase plane. This is accomplished by digitally changing the phase of each of the two vectors and summing them. The sum is output to a digital to analog converter to provide the transmitted signal.

By the use of this arrangement, the present invention allows the digital modulator to be implemented using a microprocessor which also controls various other functions of the modem. In particular, the choice of two vectors of identical magnitude and different relative phases allow the modulation to take place without the performance of time-consuming multiplication steps by the microprocessor.

Thus, the signal may be generated using only addition instructions of the microprocessor thus allowing the microprocessor sufficient time to be used to implement the modulator and have sufficient overhead in processor time to control other functions of the modem.

It has been discovered that implementation of a digital modulator with the characteristic output in the phase plane as defined above, produces lower out-of-band signals at its output and thus decreases the complexity and cost of transmit filters to be used in a modem embodying the present invention.

Thus, it is an object of the present invention to provide an improved digital PSK modulator which is implemented using a microprocessor.

It is a further object of the present invention to provide a digital modulator which is implemented by a presently available microprocessor, and which can encode and transmit data at a 600 baud/1200 bit per second rate which allows sufficient overhead and processor time to allow the processor to control all the functions of the modem.

It is a further object of the present invention to provide a differential PSK digital modulator wherein, during shifts from one relative phase to a second relative phase, a vector defining the carrier output signal in a phase plane traces a straight line between the points in the phase plane defining allowable phase values.

It is a further object of the present invention to provide a digital differential PSK modulator using a microprocessor wherein the vector defining the output signal varies in magnitude, but requires no multiplication instructions of the processor to be executed in order to effect the modulation.

These and other objects of the present invention will become apparent from the detailed description below.

DETAILED DESCRIPTION

Figure 1:
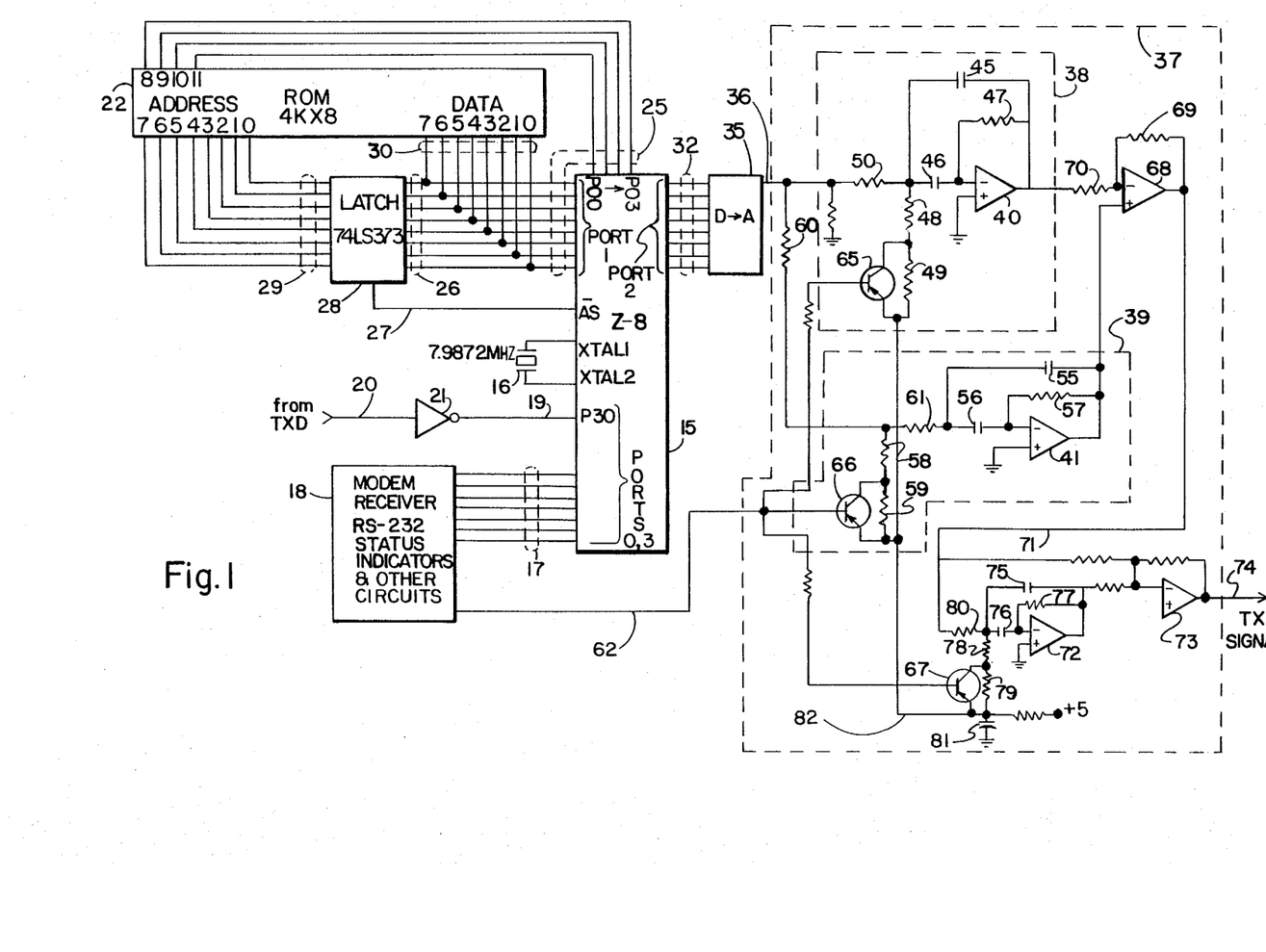
FIG. 1 is a circuit diagram of the preferred embodiment of a PSK modulator according to the present invention including the transmit filter.

Turning to the drawing figures in which like numerals represent like parts, the preferred embodiment of the present invention will now be described. FIG. 1 is a schematic diagram of the preferred embodiment. The preferred embodiment is included in a modem constructed around microprocessor 15. In the preferred embodiment, the type Z-8 microprocessor currently manufactured by Zilog Inc. of Cupertino, Calif. is used.

Details of the operation and internal structure of the Z-8 is available in the literature supplied by the manufacturer. Microprocessor 15 is the eight megahertz version of the Z-8 processor and is driven by a 7.9872 megahertz crystal 16, as shown in FIG. 1. The Z-8 interfaces with other devices through four eight bit ports designated by the manufacturer as ports 0 through 3. This notation is used in FIG. 1.

Before turning to the detailed description of the present invention, the environment of the preferred embodiment will be described. A portion of port 0 (lines P04–P07) and a portion of port 3 forms a seven line bus 17 connected to a block 18 indicated as containing the modem receiver, the RS-232 interface, status indicators, and other circuits. It should be understood that other circuitry of a modem in which the preferred embodiment resides, will also be controlled by microprocessor 15. In particular, the preferred embodiment described below has been constructed so that at least 30% of the processor time is available to control the other functions represented by block 18. Exemplary details of how other functions of a modem may be controlled through the Z-8 processor may be found in the present inventor's co-pending application Ser. No. 273,398, filed June 15, 1981 entitled "Modem With Low Part Count and Improved Demodulator", a division of which has issued as U.S. Pat. No. 4,431,867. Said U.S. Pat. No. 4,431,867 is hereby incorporated by reference exactly as if set forth herein.

The line attached to pin 30 designated as 19 in FIG. 1 receives a signal from the RS-232 interface on line 20 designated TXD. This signal is inverted by inverting buffer 21 before being supplied to pin P30. The processor performs a serial to parallel conversion of the inverted data coming in on line 19 to form dibit pairs which are to be modulated by the preferred embodiment.

The output signals of the present invention are generated by a sine table which resides in read only memory 22. Read only memory 22 is a four kilobyte read only memory with each byte being eight bits wide. The instructions which implement the steps shown in FIG. 4, together with the sine table described hereinbelow, reside within ROM 22.

Four lines of port 0 together with all of port 1 form an address bus 25 to ROM 22. Two separate steps are required to read a word out of ROM 22. First, the eight least significant address bits are written out of port 1 and appear on the lines forming bus 26. When this data is set up, an output pulse on line 27 from the negated address strobe (AS) output of processor 15 latches the data on bus 26 onto the outputs of latch 28. The outputs of latch 28 are connected to bus 29 which carry the eight least significant bits of the address. Next, the four most significant bits are written onto lines P00–P03, and a complete address is presented to ROM 22.

When the address is set up, data appears at the data output port 30 of the ROM and is read by processor 15 back in through port 1.

During execution of program steps within 256 byte pages, the same four bits may remain on output lines P00–P03. As described further hereinbelow, 128 bytes of ROM 22 contain a sine table as described hereinbelow.

Once data from line 20 has been serialized into pairs of bits (dibits), the processor will successively look up values from the sine table contained in ROM 22 and write appropriate values out to port 2, which is connected to a bus shown as 32 in FIG. 1. Bus 32 is connected to digital to analog converter 35 which provides an analog output on line 36 corresponding to the instantaneous value of the voltage to be transmitted. Line 36 is connected to the input to transmit filter 37. As noted above in the summary of the present invention, the use of a modulator according to the present invention allows a digital modulator to be constructed using less complex filters than normally required.

Transmit filter 37 is constructed of two two-pole band pass filters 38 and 39. These filters are constructed around a pair of operational amplifiers 40 and 41 which, in the preferred embodiment, are portions of a type LM338 currently manufactured by National Semiconductor, and others.

Turning first to filter 38, the frequency determining elements include capacitors 45 and 46 and resistors 47–50. Similarly, filter 39 is constructed with capacitors 55 and 56 and resistors 57–61 determining the frequency response.

A latched output from block 18 appears on line 62 to control operation of transistors 65, 66 and 67. Line 62 is held high or low according to whether the modem is in the originate or answer mode, which determines the frequency output from the preferred embodiment. Thus, when transistors 65 and 66 are turned on, resistors 49 and 59 are shorted, changing the center frequency of filters 38 and 39.

The outputs from filters 38 and 39 are algebraicly mixed by a circuit constructed around operational amplifier 68 which serves as a unity gain buffer by the choice of resistors 69 and 70 having equal values. The output from amplifier 68 appears on line 71 as an input to an all pass delay filter constructed around operational amplifiers 72 and 73. In a similar manner to filters 38 and 39, capacitors 75 and 76 and resistors 77–80 are the frequency determining elements for the all pass two-pole delay filter of the final stage of transmit filter 37. The all pass delay section of transmit filter 37 is designed to compensate for group delay distortion from filters 38 and 39.

Capacitor 81 has a relatively large value to keep the points connected to line 82 high when transistors 65–67 are cut off.

In the preferred embodiment of the present invention, filter section 38 has a bandwidth of approximately 445 hertz with a center frequency of 800 hertz when the modem is operating in the originate mode, and a center frequency of 2800 hertz when in the answer mode. Filter section 39 has a bandwidth of approximately 265 hertz with a center frequency of 1650 hertz for originate and 2 kilohertz for the answer mode. From this description, it will be apparent that the characteristics of the band pass filters overlap in a manner to give a desirable pass band for the transfer function between line 36 and line 71 for a 600 baud Bell 212A-type modem.

It will be appreciated by those skilled in the art that implementing the filter 37 shown in FIG. 1 using the values shown in the following table 1, will provide the above-recited specifications.

TABLE 1

| Resistors | Value (Ohms) |
| --- | --- |
| 47 | 127K |
| 48 | 750 |
| 49 | 10.7K |
| 50 | 68.1K |
| 57 | 215K |
| 58 | 562 |
| 59 | 453 |
| 60 | 162K |
| 61 | 383 |
| 77 | 82.5K |
| 78 | 1.96K |
| 79 | 6.81K |
| 80 | 20.5K |

| Capacitors | Value (Microfarads) |
| --- | --- |
| 45, 46, 55, 56, 75, 76 | 0.0056 |
| 81 | 10.0 |

From the foregoing, the relative simplicity of transmit filter 37 will be appreciated as contrasted to filters used in prior art 600 baud four-phase differentiald PSK modem transmitters.

The operation of the modulator built around processor 15, ROM 22, and digital to analog converter 35, which allows the relatively simplicity of filter 37 will now be described.

Figure 2:
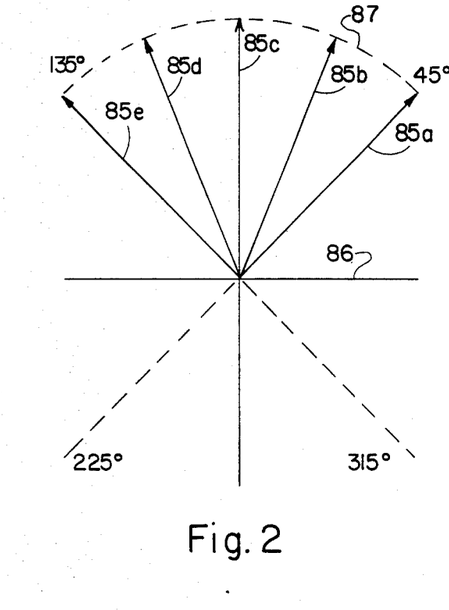
FIG. 2 shows the movement of a vector representing a PSK modulated carrier, through the phase plane for a 90° phase shift according to the prior art.

Turning next to FIG. 2, a representation of a phase plane for a carrier output signal is shown. It should be understood that the graph of the phase plane shows a vector 85 in various positions, shown as 85a, 85b ... 85e. The phase plane shown on FIG. 2 represents the phase of the vector, and thus the phase of a carrier signal relative to an arbitrary but predetermined reference shown on the positive X axis at 86.

As is known to those skilled in the art, in the transmission of differential PSK, it is only the change in phase between the phase of the carrier at one particular "bit time" and a second "bit time" which encodes information. The phrase "bit time" is used in quotation marks above to indicate that it is actually a dibit being transmitted. but the common phraseology of referring to the center of a bit time as the center point between keyings of the transmitter will be used in this specification.

From the foregoing it will be appreciated that the transition from the vector position shown at 85a to the position shown at 85e is a plus 90° phase shift of the carrier. The path taken through vectors 85a, 85b ... 85e shows that the vector end point traverses an arcuate path shown by dashed line 87 in FIG. 2. This naturally results in the fact that each of the vectors 85 is the same length as the others.

As is shown in FIG. 2, there are four allowable reference phases used in conventional four-phase differential PSK modulation. They are represented on FIG. 2 as line at 45°, 135°, 225°, and 315° from the arbitrary reference phase shown by axis 86. These are considered four predetermined valid phases within the phase plane. As will become apparent from the description below, while the preferred embodiment is a differential four-phase PSK modulator, the present invention is usable in other PSK modulators including coherent PSK, and N phase PSK encoding where N is an integer.

Since PSK is a form of phase modulation, it follows that the spectrum of the output signal contains energy at frequencies other than the carrier. The necessary bandwidth to transmit differential PSK is a function of the baud rate.

It is further known to those skilled in the art that phase shifts of the type shown in FIG. 2 produce a considerable amount of energy outside the desired transmission bandwidth for differential PSK.

It has been discovered by the inventor of the present invention that the magnitude of the out of band spectral components, as well as the compatibility of the output signal with receivers employing phase lock loops, can be dramatically improved by having the vector representing the phase of the carrier signal traverse a straight line between the four predetermined relative phase points, rather than an arcuate path, such as path 87 shown in FIG. 2. It is this discovery that forms the basis of the present invention.

It is well known to those skilled in the art, that a succession of dibit pairs requiring 90° phase shifts of the same sense increase the difficulty of tracking of the output signal by a phase lock loop in a receiver. For example, in conventional 600 baud modems, continuous 90° phase shifts present a phase lock loop with a signal that appears to be shifting by 150 hertz. Lowering the strength of this signal, so that a phase lock loop in the receiver may continue to track the transmitted signal is desirable.

Figure 3A:
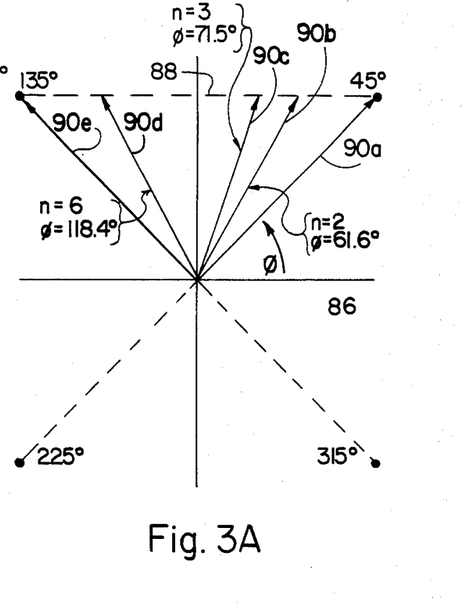
FIGS. 3A to 3C show vector representations of a PSK modulated carrier, as the vector moves through the phase plane, as generated by the present invention.

Since, as can be seen from FIG. 3A, the length of vectors 90 decrease during the 90° phase transition, it will be apparent that amplitude modulation of the output carrier signal is taking place. Since a minimum is reached as it crosses the Y axis, it will further be apparent that the apparent phase shift of a 150 Hz from continuous 90° phase changes will also provide amplitude modulation of the carrier by a signal of 300 Hz. The 300 Hz amplitude modulation which takes place creates a pair of side bands spaced at 300 Hz from the carrier. It is known that phase lock loop receivers can more readily track the phase modulated carrier signal, even though it is being displaced by an apparent value of 150 Hz, in the presence of the two side bands spaced 300 Hz from the carrier signal.

FIG. 3A shows an exemplary 90° shift according to the present invention. The path that the vector representing the carrier signal, with reference to reference phase 86, tracks between the 45° and 135° phase points, is represented by dashed line 88. The angle $\phi$ is shown relative to reference 86. Vector 90 begins at the 45° phase as shown at 90a in FIG. 3A.

The present invention being a digital modulator, the various locations of the vector 90 as represented in FIG. 3A will occur in discrete steps. In the preferred embodiment, the discrete steps are equal in time, but not equal in change of the angle $\phi$. In addition to the fact that path 88 is a straight line, it has been discovered that an improvement to the output signal is achieved by having the projection of vector 90 onto the X axis (for the example of a shift from 45 to 135 as shown) move as a cosine function of time. Thus, rather than have vector 90 rotate at a constant rate and thus have the angle $\phi$ changed by equal increments during each discrete step of the vector from the 45° phase point to the 135° phase point, vectors 90a, 90b . . . 90d change so that the projection along the X axis is a cosine function of time.

In the preferred embodiment, the plus 90° phase shift takes place over N discrete steps, each of which is referred to by an index n. In the preferred embodiment, N=8 with n=8 representing arrival at the 135° phase point in the phase plane.

The particulars of how this is accomplished will now be described. Referring back to FIG. 1 for a moment, it should be recalled that a sine table resides in ROM 22. The sine table is used to generate the output frequency according to the following formula:

$$N = (F + X + P) \text{MOD}(K) \tag{1}$$

where N is equal to an address in the sine table from which the next value is to be fetched, F is equal to a frequency determining number which will be described below, X is equal to the previous value of N and serves as a pointer to the sine table, and P equals a relative phase shift from the previous output of the carrier. The notation MOD(K) indicates that the modulo K result of the sum (F+X+P) is to be taken, and thus it can be considered the integer remainder after dividing by K.

Note that the number N generated above is the address of the next value in the sine table. The sine table simply contains K entries giving the sine for each increment of angle which is 1/Kth of a full 360° ($2\pi$ radians) circle.

In order to transmit a signal using such an arrangement, a look up to the sine table must be made at regularly spaced intervals which, in the preferred embodiment, is determined by internally generated interrupts at a predetermined interrupt frequency.

In the preferred embodiment, K is equal to 128 and thus there are 128 entries in the sine table. This being the case, each time the address N advances by one, the argument of the value contained in the sine table advances 360°/128, or 2.813°. Selections of other values of K will lead to appropriately larger or smaller increments in the argument of the sine value contained in the table.

From the foregoing, it should be appreciated that if the variable P is set to 0, and F is set equal to 1, N will be continuously incremented by 1 and one complete stepping through the entire sine table will take place at a rate determined by the interrupt frequency. For each value of N generated according to equation (1) above, a fetch is made to the Nth location of the sine table contained in ROM 22 (FIG. 1), and the value of the sine table contained at that location could be written onto bus 32 and provided as an input to D to A converter 35. The analog output corresponding to this value in the sine table would appear on line 36.

Continuing with the foregoing example, it will be readily appreciated that if the variable F is increased from one to two in equation (1) stepping through the sine table will occur twice as fast, with every other value of the sine table being read out to D to A converter 35.

From the foregoing, it will be appreciated that the actual physical frequency of the signal output by this arrangement will be equal to the variable F multiplied by the interrupt frequency and divided by the number of entries (K) in the sine table. This relationship may be expressed by the following equations.

$$F = f_c \frac{K}{f_{int}} \quad (2)$$

$$f_c = F \frac{f_{int}}{K} \quad (3)$$

In the preferred embodiment, internal interrupts are generated at 9600 hertz with every other interrupt being used to drive the signal modulator. Thus, the interrupt rate for the sine table driven carrier generator is 9600 hertz. From examination of equations 2 and 3 above, it will be apparent that F=16 in equation 1 for a 1200 hertz carrier when the modem is operated in the originate mode, and F=32 for the 2400 hertz carrier when the modem is operated in the answer mode.

While it is believed that the sine table has been adequately described in words above, exemplary ones of the 128 entries for the sine table are shown in the following table 2. In the preferred embodiment, the sine values are coded as non-signed integers taking values between 0 and 31, with 16 being the equivalent of 0 for a signed representation of the sine function. Thus, in the following table 2, the integer value (as a decimal number) actually used in the sine table of the preferred embodiment is shown in the fourth column.

TABLE 2

| N | ∅ (degrees) | SIN∅ | Integer value |
|---|---|---|---|
| 0 | 0 | 0 | 16 |
| 2 | 2.813 | 0.049 | 16 |
| 2 | 5.625 | 0.098 | 17 |
| 3 | 8.438 | 0.147 | 18 |
| 35 | 98.438 | 0.989 | 31 |
| 80 | 225.00 | −0.707 | 5 |
| 122 | 343.125 | −0.290 | 11 |
| 127 | 357.188 | −0.049 | 15 |

From the foregoing it will be readily appreciated that a table driven sine wave generator as described above may be easily implemented to generate a phase shift keyed output signal as shown in FIG. 2. However, it should be recalled that the desired result is to have the output vector trace a straight line 88 as shown in FIG. 3A, and for the projection of the output vector onto the X axis to trace a cosine function of time.

Assuming for the moment that vector 90a as shown in FIG. 3A is of unit length, it will be readily apparent that the projection of this vector onto the Y axis is as 0.707. It will further be apparent that the projection of vector 90a onto the X axis is of the same value. Since it is desired to trace a cosine function in eight equal increments as represented in FIG. 3A, it will be apparent that the Y component of this vector should remain at 0.707, and the X component of the vector should progress in steps which correspond to increments of the arc cosine of 11.25°. This is because the total 90° shift between vector 90a and 90e divided by the eight steps in which this is accomplished equals 11.25° per step. Thus, the X component for each of the vectors should have a value of cos [45+n(11.25)].

Since the Y component remains constant at 0.707 and the X component as given by the foregoing expression, it will be readily appreciated that the angle φ for each of the vectors 90 shown in FIG. 3A may be represented by the following expression.

$$\phi = \tan^{-1}\left[\frac{0.707}{\cos[45 + n(11.25)]}\right] ; \quad (4)$$

$n = [1,8]$; Arg of cos in degrees.

It will be appreciated that the foregoing equation (4) for the angle φ for each of the vectors 90 shown on FIG. 3A will implement the above-stated requirement of the present invention that the projection of the vectors 90 onto the X axis, during the transition shown, move as a cosine function of time. The results for the example of FIG. 3A are tabulated for each value of n in the following table 3.

TABLE 3

| | ±90° Shift | |
|---|---|---|
| n | | ∅n |
| 0 | | 45 |
| 1 | | 51.8 |
| 2 | | 61.6 |
| 3 | | 74.6 |
| 4 | | 90 |
| 5 | | 105.4 |
| 6 | | 118.4 |
| 7 | | 128.2 |
| 8 | | 135 |

Specific examples for n=2, 3 and 6 are shown on FIG. 3A. Since the angle φ for vectors 90 shown on FIG. 3A should shift according to equation 4 and table 3 above, the only remaining problem is the fact that vector 90 becomes shorter as one proceeds from the 45° phase point towards the Y axis, and again become longer as one proceeds away from the Y axis toward the 135° phase point. Since the sine table described above in connection table 2 provides output values for a vector of unit length, it would at first appear that multiplication of the values output from the sine table in ROM 22 by processor 15 is required prior to outputing the result to digital analog converter 35. Indeed, an embodiment of the present invention could be so constructed.

However, as is known to those skilled in the art, arithmetic multiplication steps by processors such as Z-8 take a great deal more time that addition and subtraction steps. In the environment of the preferred invention as shown in FIG. 1, the processor is generating interrupts at 9600 hertz. Even though only half of these are used, the arrangement still requires that one complete step, for example, from vector 90b to 90c, be accomplished during one interrupt period of 104.2 microseconds. Since multiplication operations by the Z-8 take on the order of 50 microseconds, there is not sufficient time within the interrupt period to look up a value in the sine table and perform a muliplication in order to shorten a vector 90 so that the Y component will remain constant, as shown in FIG. 3A.

Figure 3B:
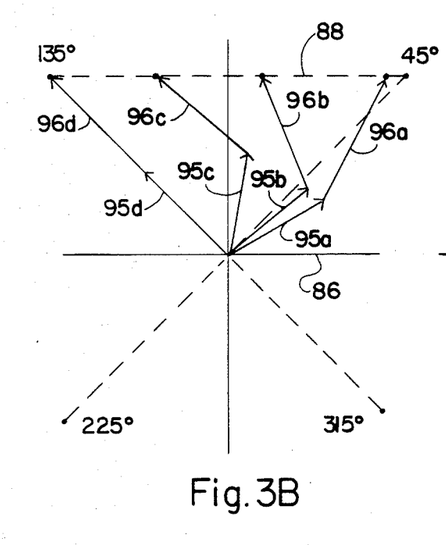

This leads to the implementation in the preferred embodiment of an elegantly simple solution to generate straight line path 88 through the phase plane by generating vectors 90 using only the sine table and addition and subtraction instructions of microprocessor 15. An example is shown in FIG. 3B. The preferred embodiment of the present invention uses a pair of vectors 95 and 96, each being of equal length.

If we begin at the 45° phase point, vectors 95 and 96 are colinear and define the vector point in the phase plane. Each of vectors 95 and 96 is generated by a sine table driven generator as described hereinabove. Initially, when the +90° phase shift shown by way of example in FIG. 3B begins, vector 95 shifts in the opposite sense of the ultimate +90° shift that the resultant is to take. An exemplary first step is shown by vector 90a wherein it can be seen that vector 95a was provided a negative shift from the 45° angle and vector 96a was provided with a positive shift. A subsequent pair of vectors is shown as 95b and 96b. From this point, vector 95b has begun moving with a positive phase shift while vector 96b has a positive phase shift. However, it can be seen from FIG. 3B that the resultant of these vectors is tracing straight line 88 to provide the desired results of the present invention.

Yet a later example includes vectors 95c and 96c. Between this point and the end point in the phase plane, vector 96 will be provided with a negative phase shift as vector 95 continues to be provided with a positive phase shift until the vectors again become colinear, at the new predetermined phase in the phase plane, as shown at 95d and 96d. Each of the vectors 95 and 96 is generated by the same sine table described hereinabove contained in read only memory 22.

Since the frequency of each signal represented by vectors 95 and 96 is constant, and their magnitudes are constant, no multiplication steps are required to provide the tracing of the resultant along line 88 as shown in FIG. 3B. Indeed, only the values for the angles of vectors 95 and 96 need be provided, then these are added, with the sum being provided as output to digital to analog converter 35.

From straightforward trigonometry and the values shown in table 3 above, sets of values for appropriate angles for vectors 95 and 96 for each value of n shown in table 3 may be readily calculated by those skilled in the art. Once a table of values for each of vectors 95 and 96 is generated, the difference between each step from N=m to N=m+1 may simply be divided by 2.813° (the smallest resolution of the sine table) corresponding to a change in the variable P (equation 1) of one. Values for these phase changes can be tabulated.

Thus, if vector 95 is considered vector 1 and vector 96 is considered vector 2, a set of variables described as PMN can easily be generated where M refers to the vector number and N refers to the index n as shown in table 3. The inclusion of the apparatus of the processor and the sine table to generate each of vectors 95 and 96 may be considered the provision of a first generator for generating a first signal, vector 95, of a predetermined magnitude and a predetermined frequency at a first phase in a phase plane represented in FIG. 3B. Likewise, the apparatus may be considered a second generator for generating a second signal, vector 96, of the same predetermined magnitude at the same predetermined frequency in the phase plane. The accumulator of the Z-8 processor is a mixing means for combining the first and second signals to provide a resultant signal which is characterized by a resultant vector having a resultant phase in the phase plane. This may be easily seen by the fact that the resultant of each of the pairs for vectors 95 and 96 shown on FIG. 3B lie at a predetermined point along line 88 and thus are characterized by a predetermined value of $\phi$ as shown in table 3.

The addition of particular values to shift vectors 95 and 96 as shown in FIG. 3B implements a phase shift control means which is responsive to the particular dibit, each dibit being one of a set of N (N being equal to 2) data signals which initially shifts the phase of vector 95 in a predetermined sense with respect to the reference phase 86, and initially shifts vector 96 in the opposite sense with respect to the predetermined reference phase. Furthermore, the apparatus further responds to continue shifting the first and second phases of vectors 95 and 96 in discrete increments so that the locus of points of the resultant vector defines a linear path in the phase plane between a first predetermined phase at the 45° point, and a second predetermined phase at the 135° point.

Figure 3C:
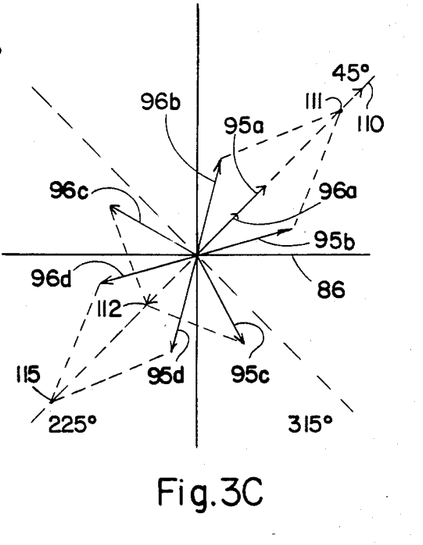

Turning next to FIG. 3C, an exemplary 180° phase shift is shown. As described above, the present invention is one in which the path between the set of predetermined phase points is a straight line. The exemplary 180° phase shift is shown between the 45° and the 225° points. Since it is also desired, for the 180° shift, that the projection of the resultant vectors along the line connecting the two points trace a cosine function of time, it will be readily appreciated that rotation of vectors 95 and 96 at a constant angular rate for the 180° case will accomplish this without resorting to the mathematics of equation 4 above. In the case of the 180° shift, vectors 95 and 96 are merely rotated in opposite senses at a constant angular rate. This produces a resultant vector which retreats from the 45° point toward the origin and back out toward the 225° phase point in a manner which is a cosine function of time.

For example, beginning at the 45° point, it may be seen that vectors 95a and 96a are superimposed leading to a resultant shown at point 110 in the phase plane. An exemplary step of 22.5° for each of the vectors, in opposite directions, brings them to the point shown as 95b and 96b. The resultant of these vectors is indicated at point 111 in the phase plane. Once the origin has been passed and the vectors arrive at points 95c and 96c a short resultant, shown as 112, is provided. Similarly, shifting continues until the point 95d and 96d is reached with the resultant being shown at 115, which is of equal magnitude to the resultant at 111. The final step of the 180° phase shift has the vectors again being colinear at an angle of 225° and the end point has been reached within the constraints of the present invention as described above.

Experience with an output signal generated by using the two vectors of equal frequency and equal magnitude, as described hereinabove, and varying their relative phase in the phase plane as also described, has shown a considerable reduction of the out-of-band signals for 600 baud 1200 bit per second PSK modulation.

Figure 4:
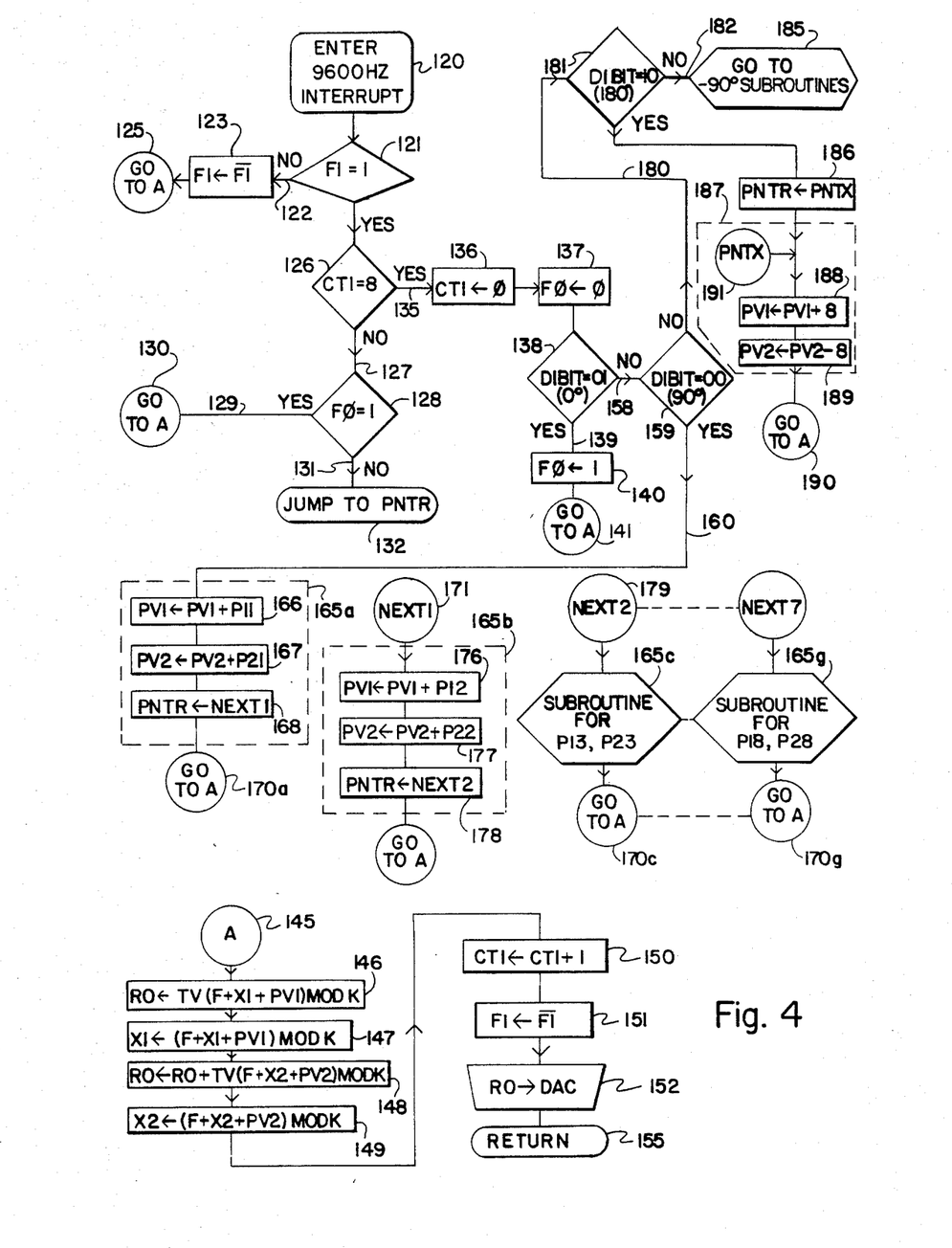
FIG. 4 is a flow diagram of the steps executed by the microprocessor shown in FIG. 1 in implementing the preferred embodiment.

The steps performed by processor 15 to implement the results described in connection with FIGS. 3B and 3C are shown in FIG. 4. So that FIG. 4 may be more readily appreciated, the definitions of the variables referred to in FIG. 4 are provided in the following table 4.

TABLE 4

| Variable | |
|---|---|
| F1 | A flag bit, complemented each pass through output subroutine and used to |

TABLE 4-continued

| | |
|---|---|
| | step an increment of phase shift on every other 9600 Hz interrupt. |
| F0 | Flag which is set when dibit being transmitted requires 0° phase shift. |
| PNTR | An address pointer in the program used to link subroutines. |
| CT1 | A counter variable used to count the 8 discrete steps for phase shifts. |
| PV1 | The value of the phase variable P for vector one's pointer to the sine table N = (F + X1 + P) MOD(K). |
| PV2 | The value of the phase variable P for vector two's pointer to the sine table N = (F + X2 + P) MOD(K). |
| DIBIT | A two bit variable taking the value of the bit pair to be encoded during an upcoming phase shift. |
| R0 | An eight bit register containing the value to be output to the DAC. |
| Constant | |
| TV(A) MOD(K) | The value from the sine table at address A MOD(K). |
| PMN | For example P21, a constant to be added to the variable PVM (e.g. PV2) for vector M at step N of the phase shifting steps. |
| PNTX | An address in the program for the entry point into the subroutine for 180° phase shift; is loaded into PNTR during these shifts. |
| NEXT1, NEXT2, ... | address pointers used to link the separate subroutines for each step for 90° phase shifts. |

The first step is represented at step 120 where the routine is entered from the internally generated 9600 hertz interrupt from the Z-8 processor. First step 121 is executed to determine if a parity flag F1 is set. If the answer is no, the interrupt which causes the program to enter step 120 is considered an even numbered interrupt and no branch 122 is taken to step 125. This occurs after flag F1 has been complemented at step 123. Step 125 leads to the output subroutine which begins at step 145 and eventually comes to return instruction 155. The output subroutine is described in detail hereinbelow. At this point, it should be understood that every other one of the 9600 Hz interrupts (for which F1 is equal to 0) will cause the program to execute the output subroutine providing a normal, non-phase shifted, progression through the sine table.

The return includes other control routines, and operates the lower priority interrupt routines for taking care of other business of the modem in which the present invention resides. On the next interrupt entered at step 120, step 121 will test positive, and a test to see if a counter variable CT1 has reached 8 is preformed at step 126. Assuming for the moment this is negative, no branch 127 is taken to decisional step 128 to test if flag F0 has been set. Flag F0 is set whenever the dibit pair 01, corresponding to no phase shift from the previous value, is detected. Thus, if the dibit currently being processed is one which requires a 0° phase shift, yes branch 129 is taken to jump step 130 noted as "go to A". If some other phase shift is in progress, no branch 131 will be taken to jump step 132 which provides a relative address contained in a pointer variable called PNTR.

By way of example, the 0°, 180°, and +90° phase shifts will be described. From the +90° phase shifts, the steps for implementing −90° phase shifts will be apparent. In the first example, assume that the previous phase shift has been accomplished and the yes branch 135 is taken from step 126. First the counter variable is cleared at 136 and the F0 flag is cleared at step 137. Next, a sequence of tests of the value of the dibit about to be encoded begins with step 138.

For the first example, assume that yes branch 139 is taken indicating that a 0° phase shift is to be provided for the next 8 signal processing interrupts (which correspond to 16 interrupts which are entered at step 120). Keep in mind that the eight interrupts correspond to the index variable n shown in table 3 above. Since the 0° phase shift is the simplest, it only requires the setting of the flag F0 at step 140 and jumping to the output subroutine A at step 141.

Subroutine A is entered at step 145. Subroutine A is the output routine which causes the generation of both vectors 95 and 96, as shown in FIGS. 3B and 3C, and causes the resultant vector to be output to digital analog converter 35, and thus to continue transmission of the carrier signal. At step 146, the variable R0 is loaded with the value from the sine table determined by (F+X1+PV1) MOD(K). As shown in table 4, X1 is the previous value of the pointer to the sine table (the address in the sine table) for the first vector. Since the phase variable PV1 for the first vector has not changed, the pointer to the sine table is simply incremented by an amount which corresponds to the constant frequency output, and thus no phase shift in the resultant output signal will be provided.

At step 147, the value of X1 is updated for the next pass through subroutine A. At step 148, the value from the sine table for the second vector is added to the previous value already contained in register R0. At step 149, the value of X2, the sine table pointer for the second vector, is updated for the next pass. Again, it will be readily appreciated that, at step 148, no change has been made to the phase variable PV2 for vector 2, and thus the new values from the sine table corresponds to the appropriate new value for a sinusoidal output of a constant frequency.

From considering the foregoing (with the example of 0° phase shift) it will readily be appreciated that while the value in R0 will change to provide the sinusoidal output, the relative phase of this signal to reference phase 86, as shown in FIGS. 3B and 3C, will remain unchanged and thus, by way of example, may be considered to be continuously outputing vectors 95a and 96a as shown in FIG. 3C. At step 150, the counter variable CT1 is incremented by one and the F1 flag is complemented at step 151.

Step 152 is an output step is which the eight bit value of variable R0 is output from port 2 of processor 15, along bus 32, as the input to digital to analog converter 35. The resulting analog signal on line 36 is filtered by filter 37 and transmitted on output line 74 to the telephone line.

Ignoring the next even numbered pass through step 121, the next interrupt which passes the parity test of step 121 will cause the following steps to be executed. Since the counter has not yet arrived at 8, branch 127 will be taken from step 126 and the F0 flag will be tested at step 128.

Since a 0° phase shift is in progress, branch 129 will be taken to step 130, and subroutine A will again be entered. The above-recited sequence of steps will be repeated and a value corresponding to a sinusoid of constant phase relative to reference phase 86 (FIGS. 3B and 3C) will be provided until the counter reaches 8.

Assuming for the moment that the interrupt upon which this occurs has been reached, branch 135 will be taken from step 136. Next assume that a dibit corresponding to a 90° phase shift is present. Branch 158 will be taken from step 138 to test 159. Since the present example assumes this test is positive, branch 160 will be taken to a subroutine enclosed with dashed line 165a. The first step of this subroutine is to add to variable PV1 a constant designated as P11. As shown in table 4, P11 is the number to be algebraicly added to the phase variable P for vector 1 on the first step of a 90° phase shift.

Similarly, variable PV2 is incremented by a predetermined amount P21 at step 167. It should be noted, by reference to FIG. 3B, that P11 will be a negative number (vector 95 is considered vector 1) and constant P21 will be a positive number. Next, the pointer variable PNTR is loaded with a constant referred to as NEXT1 at step 168. From here, a jump to subroutine A is made at step 170a.

Examining the previously described steps of subroutine A it will demonstrate that, under the circumstances of a 90° phase shift, variables PV1 and PV2 will have been modified by the steps described immediately above. Thus, the resultant vector, which is in the register containing variable R0 at steps 148, will be a resultant vector lying along line 88 shown in FIG. 3B.

On the next odd numbered interrupt (flag F1 equals 1), the test at step 126 fails as does the step at test 128. Since this occurs, no branch 131 is taken and the relative jump instruction at 132 jumps to an address determined by the pointing variable PNTR. Since, at step 168 within subroutine 165a, this was loaded with a value of NEXT1, the program jumps to entry point 171. Subroutine 165b is conceptually identical to subroutine 165a except that the constant values for P12, P22, and NEXT2, are different. Thus, within subroutine 165b, the appropriate change in the phase variable for each of the vectors is made and, at step 170b, the output subroutine A is executed. The next time through the program, the value NEXT2 is the value of the pointer to which the program jumps at step 132 and thus entry point 179 for subroutine 165c is reached.

From the foregoing it will be readily appreciated that the preferred embodiment of the present invention has been constructed so that the constant values, PMN, for change of phase of each of the two vectors are stored in distinct subroutines together with a pointer to the next subroutine for the next incremental step across the 90° phase change. It has been found by the inventor of the present invention that the use of additional space in ROM 22 to store the separate subroutines wherein the variables for PMN are each written, together with the pointer to the next subroutine, is preferable to placing them in a look up table. Thus, a trade off has been made in favor of speed of execution at the cost of use of instruction ROM space.

Since further detail would belabor the point, it will be readily apparent that the above-described sequence proceeds through subroutines 165c on to subroutine 165g to accomplish the phase changes shown in FIG. 3B. Once this has been accomplished, the next execution of step 126 will cause yes branch 135 to be taken indicating that this phase shift has been accomplished.

Assume for the next example that the value of dibit equals 10 and thus a 180° phase shift is required. Under these circumstances, no branch 180 will be taken from step 159 to test step 181. First, it will be apparent that if no branch 182 is taken from this step that the only possible remaining value for dibit is 11, which causes the program to go to a set of subroutines 185 for a −90° phase shift. It will be readily apparent to those skilled in the art that the set of subroutines 195 will be identical, except for the values of PMN used, to subroutines 165a–165g.

Returning to the example of the 180° phase shift, yes branch 185 will be taken. The next step executed is to load the pointer PNTR with a constant value PNTX at step 186. This will cause the program to enter a subroutine 187 for constantly incrementing and decrementing the phase variables for the two vectors by the same amount on each subsequent pass through the program. The first step is step 188 in which the phase variable for the first variable is incremented by eight. The phase variable for the second variable is decremented by eight at step 189, and the program branches to the output routine at jump step 190.

It should be recalled from the discussion of FIG. 3C that each of the vectors is stepped 22.5° for each of the eight steps through the 180° phase change. Since each incrementing of the address in the sine table corresponds to a stepping of 2.813°, changing the phase variable by eight corresponds to a phase shift of 22.5° and thus the selection for the values at steps 188 and 189. When the output subroutine has been implemented, the next pass from step 120 to step 128 will cause branch 131 to be taken. Since the pointer variable has been loaded with the value PNTX, the program jumps to step 191, the entry point for the 180° phase shift subroutine 187. It will be readily appreciated that this continues through eight passes of the output subroutine A until processor 15 is ready for the next dibit to be encoded.

From the foregoing description, implementing the steps shown in FIG. 4 in assembly language or machine language will be readily apparent to persons skilled in the art.

It will be further appreciated that other embodiments of the present invention can be constructed in view of the teaching contained in the foregoing specification, but that the description of the preferred embodiment contained above presents what the inventor believes to be the best mode of making and using the invention.

Also, from the foregoing description it will be appreciated that the present invention accomplishes the objects set forth above and provides an improved PSK modulator with an output signal having an output spectrum which may be adequately filtered with less complex filters than those of the prior art. In particular, the spectrum of the output signal of the present invention is one for which lower order filters may be used to define the pass band, and thus allow simpler filters to be used to compensate for group delay in the initial filter. This leads to overall greater simplicity for the transmit filter.

Since many other embodiments of the present invention may suggest themselves to those skilled in the art based on the foregoing disclosure, the invention is only to be limited by the claims below.

I claim:

1. An improved phase shift keyed modulator for providing a carrier signal of predetermined frequency at one of a set of predetermined phases in a phase plane with respect to a predetermined reference in said phase plane, and for selectively providing said carrier signal at a different one of said set of predetermined phases in response to an input stream of signals comprising in combination:

a first generator for generating a first signal of a first predetermined magnitude at said predetermined frequency and a first phase in said phase plane;

a second generator for generating a second signal of a second predetermined magnitude at said predetermined frequency and a second phase in said phase plane;

mixing means for combining said first and second signals to provide a resultant signal characterized by a resultant vector characterized by a resultant phase in said phase plane;

phase shift control means responsive to a first set of N of said data signals, N being an integer greater than zero, to initially shift said first phase in a predetermined sense with respect to said predetermined reference phase, and to initially shift said second phase in an opposite sense with respect to said predetermined reference phase;

said phase shift control means being further responsive to said first set of N of said data signals to continue shifting said first and second phases in discrete increments so that the locus of points of said resultant vector for each of said discrete increments defines a linear path between a first one of said set of predetermined phases and a second one of said set of predetermined phases in said phase plane; and means coupling said carrier signal to a transmission channel.

2. An improved phase shift keyed modulator for providing a carrier signal of predetermined frequency, represented by a vector in a phase plane at one of a set of predetermined phases in said phase plane with respect to a predetermined reference phase in said phase plane, and for selectively providing said carrier signal at a different one of said set of predetermined phases in response to an input data stream of data signals, comprising in combination:

shift control means responsive to a first set of N of said data signals, N being an integer greater than zero, to shift the phase of said carrier from a first one of said set of predetermined phases to a second one of said set of predetermined phases so that the end point of said vector traces a straight line in said phase plane between said first one and said second one of said set of predetermined phases; and means for coupling said carrier signal to a transmission channel.

3. An improved modulator as recited in claim 2 wherein:

said modulator is a digital modulator, and said shift control means is responsive to said set of N data signals to shift said vector from said first one of said set of predetermined phases in said phase plane to said second one of said set of predetermined phases in said phase plane in M discrete steps, M being an integer greater than two, and to cause said vector, at each of said discrete steps, to be at an angle $\phi$ with respect to said predetermined reference phase defined by:

$$\phi_n = \tan^{-1}\left[\frac{0.707}{\cos[45 + n(11.25)]}\right]$$

where n takes values [1,M], for shifts for which said first and second predetermined phases are spaced apart 90° in said phase plane.

4. An improved phase shift keyed modulator for providing a carrier signal of predetermined frequency at one of a set of predetermined phases in a phase plane with respect to a predetermined reference phase in said phase plane, and for selectively providing said carrier signal at a different one of said predetermined phases in response to an input data stream of data signals, comprising in combination:

a first generator for generating a first signal of a predetermined magnitude at said predetermined frequency and at a first phase in said phase plane;

a second generator for generating a second signal of said predetermined frequency and of said predetermined magnitude, and at a second phase in said phase plane;

mixing means for combining said first and second signals to provide a resultant signal characterized by a resultant phase in said phase plane;

phase control means responsive to each occurrence of a predetermined set of N of said data signals, N being an integer than zero, to cause said first phase to shift at a constant angular rate in a first sense with respect to said reference phase, and for causing said second phase to shift at said constant angular rate in a second sense, opposite said first sense, with respect to said reference phase, so that the end point of a vector representing said resultant signal in said phase plane traces a straight line through the origin of said phase plane to effect a 180° phase shift in said carrier from a first one of said set of predetermined phases to a second one of said predetermined phases; and means for coupling said carrier signal to a transmission channel.

* * * * *